(12) United States Patent
Nojoumian

(10) Patent No.: US 11,221,623 B2
(45) Date of Patent: Jan. 11, 2022

(54) ADAPTIVE DRIVING MODE IN SEMI OR FULLY AUTONOMOUS VEHICLES

(71) Applicant: Florida Atlantic University Board of Trustees, Boca Raton, FL (US)

(72) Inventor: Mehrdad Nojoumian, Boca Raton, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 209 days.

(21) Appl. No.: 16/165,559

(22) Filed: Oct. 19, 2018

(65) Prior Publication Data
US 2019/0129422 A1    May 2, 2019

Related U.S. Application Data

(60) Provisional application No. 62/580,225, filed on Nov. 1, 2017.

(51) Int. Cl.
*G05D 1/00* (2006.01)
*B60W 30/02* (2012.01)
*B60W 40/09* (2012.01)

(52) U.S. Cl.
CPC ......... *G05D 1/0088* (2013.01); *B60W 30/025* (2013.01); *B60W 40/09* (2013.01)

(58) Field of Classification Search
None
See application file for complete search history.

(56) References Cited

U.S. PATENT DOCUMENTS

| 9,766,625 | B2 | 9/2017 | Boroditsky et al. | |
| 10,077,056 | B1* | 9/2018 | Fields | B60W 50/0098 |
| 10,732,627 | B1* | 8/2020 | Roberson | B60W 50/0098 |
| 2010/0256852 | A1 | 10/2010 | Mudalige | |
| 2014/0195213 | A1* | 7/2014 | Kozloski | H04W 4/70 703/8 |
| 2015/0106289 | A1* | 4/2015 | Basir | G07C 5/08 705/325 |

(Continued)

OTHER PUBLICATIONS

J. Healey and R. Picard, "Detecting Stress During Real-World Driving Tasks Using Physiological Sensors", 2005 https://affect.media.mit.edu/pdfs/05.healey-picard.pdf,.

(Continued)

*Primary Examiner* — Jonathan M Dager
*Assistant Examiner* — Garrett F Evans
(74) *Attorney, Agent, or Firm* — Fox Rothschild LLP

(57) ABSTRACT

Systems and methods for controlling a vehicle. The methods comprise: receiving, by a computing device from at least one sensor, first sensor information specifying actions taken by a person while driving the vehicle or another vehicle; performing machine learning operations to learn first driving habits of the person based on at least one of the first sensor information; determining at least one autonomous driving rule for a particular driving style setting of a plurality of driving style setting options based on the machine-learned driving habits of the person; programming the particular driving style setting using the at least one autonomous driving rule; and causing the vehicle to enforce the at least one autonomous driving rule when the particular driving style setting is selected.

30 Claims, 8 Drawing Sheets

(56) References Cited

U.S. PATENT DOCUMENTS

| | | | |
|---|---|---|---|
| 2017/0174221 A1* | 6/2017 | Vaughn | G05D 1/021 |
| 2017/0297586 A1* | 10/2017 | Li | G05D 1/0088 |
| 2018/0107942 A1* | 4/2018 | Jiang | G08G 1/0112 |
| 2018/0122160 A1* | 5/2018 | Heredia | G07C 5/006 |
| 2018/0307228 A1* | 10/2018 | Smith | B60W 60/001 |
| 2018/0335785 A1* | 11/2018 | Miller | B60W 50/0098 |
| 2019/0031145 A1 | 1/2019 | Trelin | |
| 2019/0071100 A1 | 3/2019 | Xavier | |
| 2019/0129422 A1 | 5/2019 | Nojoumian | |
| 2019/0337532 A1 | 11/2019 | Myers et al. | |

OTHER PUBLICATIONS

G. F. Wilson, J. D. Lambert, and C. A. Russell, "Performance enhancement with real-time physiologically controlled adaptive aiding," Proceedings of the Human Factors and Ergonomics Society 46th Annual Meeting, vol. 3, pp. 61-64, 1999.
H. S. Shin, et al., "Real Time Car Driver's Condition Monitoring System," IEEE, Sensors 2010.

* cited by examiner

ADAPTIVE DRIVING MODE IN SEMI OR FULLY AUTONOMOUS VEHICLES

CROSS-REFERENCE TO RELATED APPLICATIONS

The present application claims the benefit of U.S. Patent Ser. No. 62/580,225 filed Nov. 1, 2017. This patent application is hereby incorporated by reference in its entirety.

BACKGROUND

Statement of the Technical Field

The present disclosure relates generally to vehicles. More particularly, the present disclosure relates to implementing systems and methods for controlling operations of semi and/or fully autonomous vehicles based on machine-learned driving styles of one or more people.

Description of the Related Art

Although semi or fully autonomous vehicles are becoming a reality in our life, many people still like to drive and be able to switch back-and-forth between self-driving and human-driving modes. In addition, people feel more comfortable if they observe that the car has a driving style similar to their own driving style or a specific person's driving style when it is in the self-driving mode, e.g., one may get use to his/her partner driving style. Furthermore, recent studies indicate that people have negative attitudes toward utilizing autonomous platforms such as self-driving cars. This discovery also highlights the necessity and urgency of developing new technologies by which a semi or fully autonomous vehicle first learns and then mimics the way that a specific driver controls the same vehicle in a non-autonomous mode. This technology can lead to a convenient, pleasant and trustworthy experience, when it is in the self-driving mode, for the driver and passengers who get used to that specific driving style. Therefore, there is a need to address these issues in semi or fully autonomous vehicles.

SUMMARY

The present disclosure concerns implementing systems and methods for controlling a vehicle when it is in the semi or fully autonomous mode. The methods comprise: receiving, by a computing device (A) from at least one sensor, first sensor information specifying actions taken by a person while driving the vehicle in the human-driving mode, and/or (B) from a menu with different options and/or from a natural language processing unit, first user-inputted information specifying the person's driving style; performing machine learning operations to learn first driving style of the person based on the first sensor information if sensory information is available regardless of user-inputted information; determining at least one autonomous driving rule for a particular driving style setting of a plurality of driving style setting options based on the machine-learned driving habits of the person as long as it is safe and it complied with general driving rules; programming the particular driving style setting using the at least one autonomous driving rule; and causing the vehicle to enforce the at least one autonomous driving rule when the particular driving style setting is selected.

In addition, the methods further comprise: receiving a user software interaction for activating the Adaptive Driving Mode ("ADM") of the vehicle; transitioning an operational mode of the vehicle from a normal self-driving mode to an ADM operate or ADM learn mode. In the former case, the ADM in response to the user software interaction operates based on the previously machine-learned and/or user-inputted data. In the latter case, the human-driving mode is selected to state the learning process: prompting a user to select a machine learning option when the vehicle is in the learning process, including but not limited to, supervised, unsupervised, semi-supervised, etc. The sensor data and/or user inputted data, if any, is received, the machine learning operations are performed, the at least one autonomous driving rule is determined, and the particular driving style setting is programmed. The new autonomous driving rule is enforced when the ADM Operate mode is selected based on a specific person's driving style. When there are no programmed driving style settings, the vehicle operates in the normal self-driving mode.

In some scenarios, a memorized active driving style and parameter values are exchanged with at least one adjacent vehicle for achieving objectives of an ADM software module and objectives of the vehicle. Additionally or alternatively, an unusual, aggressive, or unsafe driving style is reported to at least one of a driver of the vehicle, a registered owner of the vehicle, or enforcement personnel. A driving style setting option may also be automatically selected based on biometric information of a driver of the vehicle.

BRIEF DESCRIPTION OF THE DRAWINGS

The present solution will be described with reference to the following drawing figures, in which like numerals represent like items throughout the figures.

DETAILED DESCRIPTION

Figure 1:
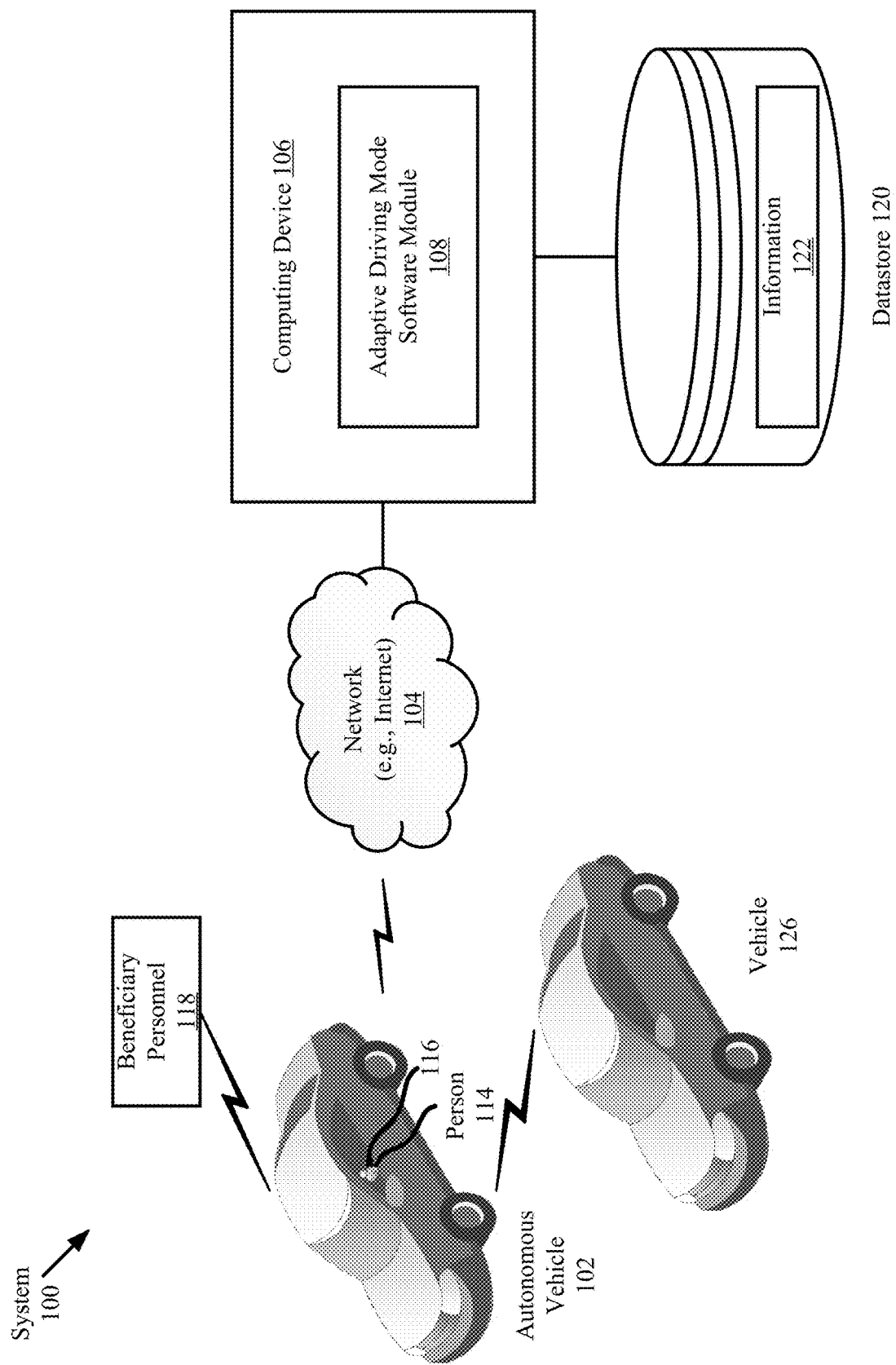
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, although semi or fully autonomous vehicles are becoming a reality in our life, many people still like to drive and be able to switch back-an-forth between self-driving and human-driving modes. In addition, people feel more comfortable if they observe that the car has a driving style similar to their own driving style or a specific person's driving style when it is in the self-driving mode, e.g., one may get use to his/her partner's driving style. Furthermore, recent studies indicate that people have negative attitudes toward utilizing autonomous platforms such as self-driving cars. This discovery also highlights the necessity and urgency of developing new technologies by which a semi or fully autonomous vehicle first learns and then mimics the way that a specific driver controls the same in a non-autonomous mode. This technology can lead to a convenient, pleasant and trustworthy experience, when it is in the self-driving mode, for the driver and passengers who get used to the specific driving style. The present solution therefore provides a novel technology to address the aforementioned problems.

The present solution generally concerns implementing systems and methods for controlling operations of an autonomous vehicle based on machine-learned driving style of one or more drivers. An Adaptive Driving Mode ("ADM") helps the autonomous system learn driving styles of different drivers who use the same vehicle. This feature provides driving opportunities for each driver in order to learn and memorize the driver's habits, patterns and/or behaviors. The ADM can then mimic the driving style of each driver in semi or fully autonomous mode. In other words, the vehicle will adaptively imitate the driving styles of different drivers based on the selected style setting option (e.g., style: 1-N, where N is an integer). For instance, two people who drive the same vehicle may have different safe-driving styles (e.g., one person may drive five miles below the speed limit, avoid over-passing other cars, take mostly right-lanes, etc., whereas the other person may have a totally different driving style). It becomes convenient, pleasant and trustworthy if the main passenger selects the driving mode in semi or fully autonomous cars that is matched with his/her own driving style, or with the driving style of a person with whom (s)he is comfortable.

The observation indicates that, when an autonomous vehicle learns the driving style of a person and then emulates that behavior, the person's level of trust, and consequently, satisfaction are increased while the level of anxiety and fear are decreased. The present solution therefore provides a convenient, pleasant and trustworthy experience for humans who utilize autonomous vehicles such as self-driving cars, autonomous military vehicles, autonomous airplanes, autonomous helicopters, etc.

Referring now to FIG. 1, there is provided an illustration of an illustrative system 100. System 100 is generally configured to control operations of autonomous vehicles based on machine-learned driving habits, patterns and/or behaviors of one or more people. System 100 is not limited to the architecture shown in FIG. 1. System 100 can include more or less components than that shown based on a given application. In this regard, it should be understood that FIG. 1 shows an architecture for the remote control of a fully automated or semi-automated vehicle 102 based on machine-learned driving habits of a person 114. However, the present solution need not comprise the remote control of the vehicle, but rather the local control of the vehicle. In this case, the functions and features of components 106 and/or 108 are implemented within the vehicle instead of external to the vehicle. As such, the need for network 104 would be eliminated except for when any information is to be stored in a remote datastore 120 and/or accessed by the vehicle 102.

As shown in FIG. 1, system 100 comprises an autonomous vehicle 102, a network 104, a computing device 106 with an ADM software module 108, and a datastore 120. Any autonomous vehicle can be used herein without limitation. For example, the autonomous vehicle includes, but is not limited to, a self-driving car (as shown in FIG. 1), an autonomous military vehicle, an autonomous airplane, an autonomous helicopter, and/or an autonomous mobile robot. An illustrative system architecture for the vehicle 102 will be discussed below in relation to FIG. 2.

The vehicle 102 is generally configured to communicate data to and from the computing device 106 via the network 104 (e.g., the Internet or World Wide Web). In this way, the vehicle is registered with the system so that the vehicle's operations can be monitored and controlled by the computing device 106 in accordance with the person's driving styles. This registration can be achieved by exchanging messages between the vehicles and the remote computing device 106 to sign-up or join a service.

The ADM software module 108 of the computing device 106 facilitates the machine learning of people's driving habits and the configuration of the autonomous vehicle's operational mode based on the machined learned driving habits. As such, two options are provided for user selection when the ADM mode is activated, namely (A) an ADM learn option while the vehicle is in a human-driving mode and (B) an ADM operate option while the vehicle is in a self-driving mode. Note that, only in semi-autonomous vehicles, the ADM learn and operate modes may act at the same time, i.e., the vehicle can operate based on a specific driving style while learning new rules associated with that driving style because the drive is partially in charge.

In the ADM learn scenarios, the semi or fully autonomous vehicle 102 performs various operations to continuously or periodically collect sensor data specifying actions taken by a driver while driving the vehicle is human-driving mode, and/or user-inputted information specifying the person's driving style. The collected sensor data and/or user-inputted information is stored local to or remote from the semi or fully autonomous vehicle 102.

In the ADM operate scenarios, the semi or fully autonomous vehicle 102 checks to see if a driving style (e.g., 1) has been previously learned and/or memorized. If so, then the semi or fully autonomous vehicle 102 configures itself to operate in accordance with the previously learned driving style setting selection option (e.g., 1). If not, then an error message is output from the vehicle to the person 114. The person 114 is then prompted to select one of two operational modes, namely a normal self-driving mode that does not follow a specific person's driving style, or a human-driving mode to start the learning process in which the vehicle will perform operations to learn the driving habits of the driver who manually controls the vehicle and inputs information about his/her driving style.

Each of the above mentioned driving style setting selection options has one or more pre-defined rules associated therewith for controlling operations of the autonomous vehicle. For example, a first pre-defined rule of a first driving style setting selection option is designed to mimic a first person's driving habits. A second pre-defined rule of a second driving style setting selection option is designed to mimic a second different person's driving habits. The first or second pre-defined rule states that (1) the speed of the autonomous vehicle is to remain below a given threshold value which is selected based on machined-learned driving habits of the person (e.g., 5 miles below the speed limit), (2) the vehicle should not make more than a certain number of lane changes (which is selected based on machined-learned driving habits of the person) in a given amount of time, (3) the vehicle should mostly use right-hand-side lanes, (4) the vehicle should avoid over-passing other cars, (5) the entertainment unit should have a specific setting (e.g., the volume of sound, the radio/satellite channel, etc.), and (6) other actions associated with the driving style. The present solution is not limited to the particulars of this example.

Notably, the parameter values of the rules associated with the driving style setting selection options can be selected (a) based on user inputs, (b) based on machine-learned driving habits of the person, and/or (c) dynamically changed in response to changes in the person's driving habits and/or a change in who is using the vehicle at a given time. In semi-autonomous scenarios, the rules associated with the selected driving style may cause user controls for controlling operations of the vehicle to be overridden if it is safe, or the rules to be reminded to the driver who has selected that specific driving style.

The person's driving habits are learned by the computing device 106 using sensor data generated by one or more sensors disposed within the vehicle 102. An illustrative architecture for the computing device 106 will be discussed below in relation to FIG. 3. The sensors will be discussed in more detail below in relation to FIG. 2. Sensor data is communicated from the vehicle 102 to the ADM software module 108 for processing. At the ADM software module 108, the sensor data is analyzed to determine driving habits of the person. The determined driving habits are then used to generate one or more rules for autonomously controlling operations of the vehicle 102 when the person is riding therein. The rule(s) and/or parameter value(s) thereof can be dynamically changed based on detected changes in the person's driving habits. The generated rule(s) is(are) then stored in a local memory of the vehicle so as to be associated with a particular driving style setting selection option for the adaptive driving mode.

Besides, other information can be used by the computing device 106 to adjust the operation mode of the vehicle whether the ADM is deactivated or activated with ADM learn mode or ADM operate mode. This other information can include, but is not limited to, operational information received from one or more adjacent vehicles 126, i.e., self-driving or human-driving vehicles, or road and traffic information.

When the adaptive driving mode is activated, two options are provided for the user selection, namely (A) an ADM learn option while the vehicle is in human-driving mode, and (B) an ADM operate mode while the vehicle is in self-driving mode. In the ADM learn case, the human-driving mode is selected to start the learning process. In the ADM operate case, one of a plurality of pre-defined driving style setting selection options is chosen based on the previously machine-learned and/or user-inputted data either in response to (1) a user-software interaction or (2) reception of information identifying the person present within the vehicle (e.g., a mobile communication device identifier or other identifier obtained via a short range communications such as Bluetooth communications). The vehicle 102 then reconfigures its operations in accordance with the selected driving style setting option (e.g., 1).

During operation, the person 114 initially has the option to activate the ADM mode of the vehicle 102. If the ADM mode is not activated, then the vehicle 102 will continue to operate in a normal self-driving mode that does not follow a specific person's driving style. In response to a user software interaction selecting the ADM mode, the person 114 is presented with two options, namely an ADM operate option and an ADM learn option.

In the ADM operate scenarios, the semi or fully autonomous vehicle 102 checks to see if information specifying rules for a driving style setting (which was previously generated by the AMD software module 108 based on the person's driving habits) is stored in a local memory of the vehicle. If so, the semi or fully vehicle 102 operates in accordance with the ADM implementing the rules associated with the particular driving style setting. Otherwise, an error message appears and the person 114 is then prompted to select one of two operational modes, namely a normal self-driving mode that does not follow a specific person's driving style, or a human-driving mode to start the learning process in which the vehicle will perform operations to learn the driving habits of the driver who manually controls the vehicle and inputs information about his/her driving style.

In the ADM learn scenarios, the semi or fully autonomous vehicle 102 will activate the normal human-driving mode and begin performance of machine learning operations. The machine learning operations involve collecting (A) sensor data specifying actions taken by the person 114 while manually driving the vehicle 102, and/or (B) user-inputted information specifying the person's driving style. The sensor data can include, but is not limited to, time stamped information indicating speeds of the vehicle, gear shifts made by the person, vehicle braking, vehicle turning, and/or auxiliary device settings (e.g., radio channels, volume settings, lighting settings, etc.). The sensor data may be filtered to remove any information that relates to unsafe-driving habits (e.g., going over the speed limit, sharp turns, tailgating, etc.). The machine learning operations can be performed continuously or periodically during the normal human-driving mode.

The machine learning process can be supervised meaning that the person 114 also provides inputs to the learning module by simple expressions, menu selections, etc. The vehicle 102 utilizes voice recognition and/or natural language processing technology to interpret the person's simple expression inputs. In addition, the vehicle 102 receives information from sensors, cameras, radars, a Global Positioning System ("GPS"), and electronic control units to learn the person's driving habits, patterns, and/or behaviors. A wide range of information is continuous or repeatedly collected to be processed, learned, and memorized. This information can include, but is not limited to, speed and acceleration in city/town or highways/interstates, braking style, use of left/right lanes, taking highways vs streets/avenues, type of the music or radio channels, etc.

If the selected learning process is unsupervised, the vehicle 102 does not receive any direct inputs from the person 114. The vehicle 102 relies on inputs from, including but not limited to, sensors, cameras, radars, GPS, and electronic control units.

One of the major issues with the technology of the fully or semi autonomous vehicles is that they may not be able to accurately predict the behavior of other self-driving and human-driving vehicles. This predication is essential to properly navigate autonomous vehicles on roads. This is more critical when it comes to human-driving cars due to unexpected decisions by drivers. Therefore, vehicle 102 and other adjacent vehicles 126, self-driving or human-driving vehicles, can exchange information regarding the memorized active driving style and parameter values so that, not only the ADM software module can accomplish its objectives but also the autonomous vehicle can be navigated properly by using this auxiliary information. In other words, in some scenarios, parameter values thereof (e.g., speed) are dynamically modified based on operational information sent/received to/from adjacent vehicles 126. Broadcast communications can be used to communicate operational information between vehicles. Each vehicle may broadcast information therefrom in response to its detection of another vehicle in proximity (e.g., within 50-100 feet) thereof.

In any scenario, the person's habits are additionally learned and memorized to control operations, parameters and/or settings of auxiliary devices of the vehicle 102. The auxiliary devices include, but are not limited to, radios, lights, displays and/or any other entertainment system.

In any scenario, if at least one unusual, aggressive, or unsafe driving style is observed by a sensing device 116 (e.g., speeding), not only the driver will be warned of his/her unsafe actions, but also this information can be sent to the main registered owner of the vehicle (e.g., parents, company's owner, etc.), police department, insurance companies, or any involved beneficiary depending of the setting.

Figure 2:
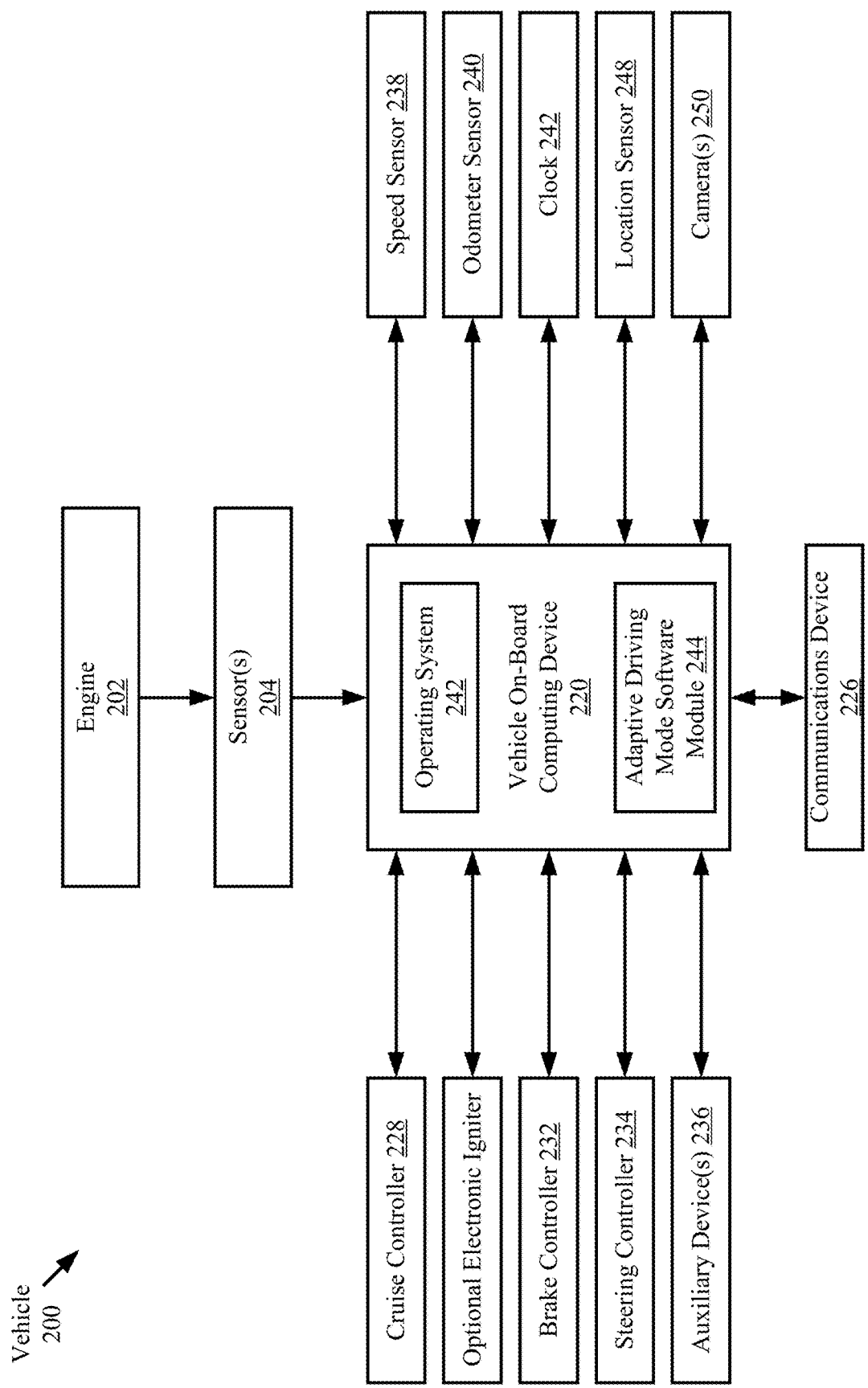
FIG. 2 is an illustration of an illustrative architecture for a vehicle.

Referring now to FIG. 2, there is provided an illustration of an illustrative system architecture 200 for a vehicle. Vehicle 102 of FIG. 1 can have the same or similar system architecture as that shown in FIG. 2. Thus, the following discussion of system architecture 200 is sufficient for understanding vehicle 102 of FIG. 1.

As shown in FIG. 2, the system architecture 200 comprises a vehicle on-board computing device 220 connected to a communication device 226. The communication device 226 is configured to facilitate wired and/or wireless communications with external devices (e.g., computing device 106 of FIG. 1). In this regard, the communication device 226 includes a transceiver and an antenna. Transceivers and antennas are well known in the art, and therefore will not be described herein. Any known or to be known transceiver and antenna can be used herein. For example, a radio transceiver and a radio antenna can be used here.

The communication device 226 allows for telemetry of vehicle related information. The vehicle 200 includes an engine 202 and a plurality of sensors 204 measuring various parameters of the engine 202. Still, it should be noted that the sensors 204, in some examples, comprise an exhaust gas sensor, an engine knock sensor, an oil pressure sensor, an engine temperature sensor, a battery voltage sensor, an alternator current sensor, an engine RPM sensor, and a throttle position sensor. Other sensors 238, 240, 248, 250 are also provided in the vehicle 200. These sensors include a speed sensor 238, an odometer sensor 240, a location sensor 248 (e.g., a GPS device), and camera(s) 250. Each of the listed sensors is well known in the art, and therefore will not be described herein.

During operations, measurement information is communicated from the sensors 204, 238, 240, 248, and/or 250 to the vehicle on-board computing device 220. The vehicle on-board computing device 220 forwards the measurement data to a remote computing device (e.g., computing device 106 of FIG. 1) via communications device 226 and/or locally analyzes the measurement data from the sensors for purposes of determining the driving habits of a person driving the vehicle. Rules for a particular driving style setting selection (e.g., 1, 2 or 3) are generated based on the determined driving habits of the person. The rules are then stored in a local memory of the vehicle on-board computing device 220 for later use in the autonomous control of the vehicle 200 and/or auxiliary device(s) 236 when a respective driving style setting option is selected automatically or manually. For example, the vehicle on-board computing device 220 controls braking via a brake controller 232, a vehicle speed via cruise controller 228, and/or a vehicle direction via steering controller 234 in accordance with a rule associated with the selected driving style setting.

The operating system 222 is configured to support the vehicle on-board computing device's basic functions, such as scheduling tasks and executing applications. The ADM software module 244 is a computer program that implements all or a portion of the methods described herein for controlling an autonomous vehicle based on (A) machine-learned driving habits of one or more people, and/or (B) user-inputted information about user's driving style. The operations of the ADM software module 244 are the same as or similar to the ADM software module 108 of FIG. 1, and will become evident as the discussion progresses. The clock 242 is an electrical device for measuring time.

Vehicle history information is logged in a memory (not shown in FIG. 2) of the vehicle on-board computing device 220, or an external datastore (e.g., datastore 120 of FIG. 1). The vehicle history information includes historical data related to the vehicle, and can be used to determine whether or not the vehicle operated appropriately in view of a the person's driving habits. A unique identifier is provided for the vehicle. The vehicle history information is stored so as to be associated with the unique vehicle identifier. The unique vehicle identifier can include numbers, letters, symbols or a combination of the same.

Figure 3:
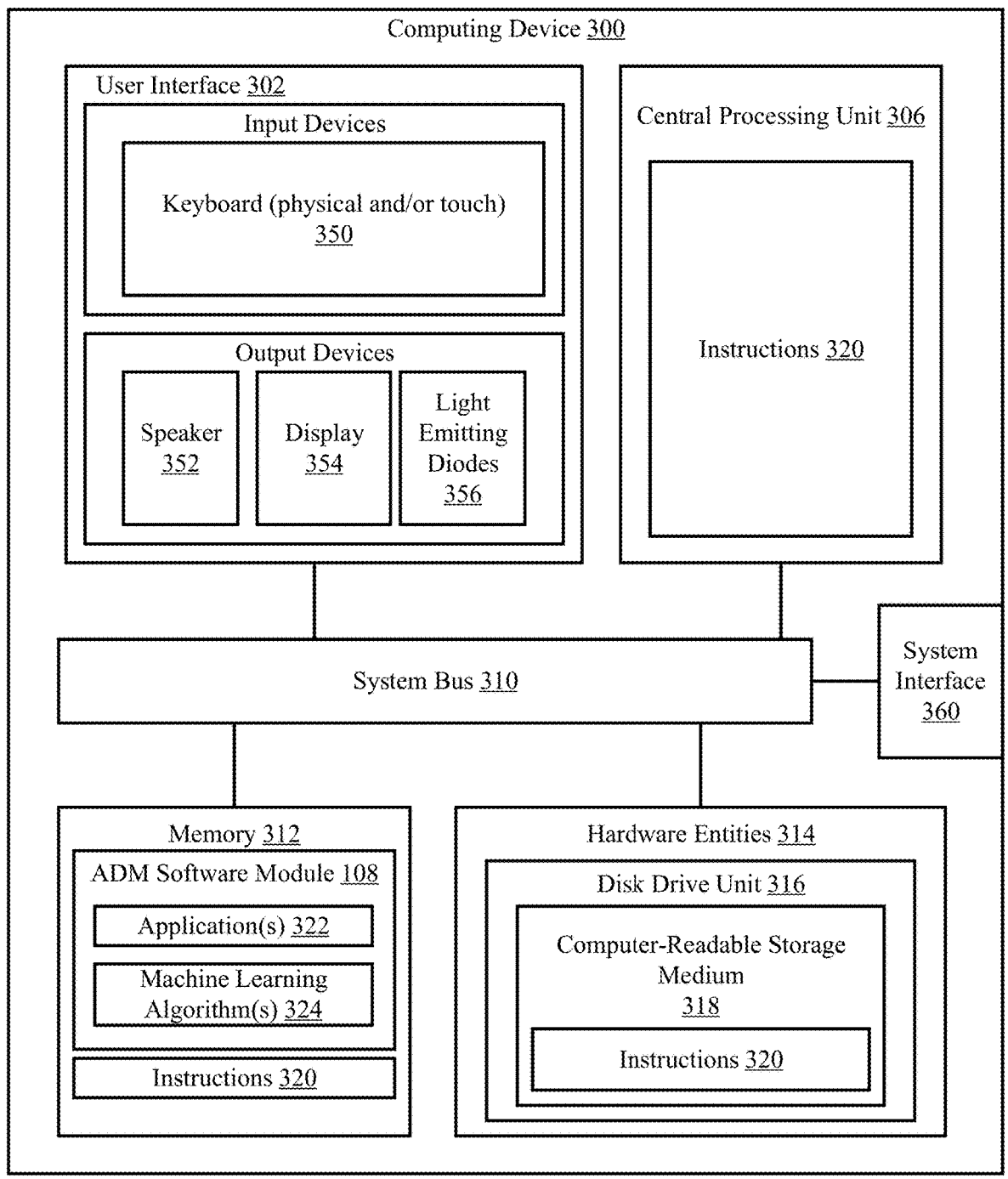
FIG. 3 is an illustration of an illustrative architecture for a computing device.

Referring now to FIG. 3, there is provided an illustration of an illustrative architecture for a computing device 300. Computing device 106 of FIG. 1 and/or vehicle on-board computing device 220 of FIG. 2 is(are) the same as or similar to computing device 300. As such, the discussion of computing device 300 is sufficient for understanding these components of system 100 and/or vehicle 200.

In some scenarios, the present solution is used in a client-server architecture. Accordingly, the computing device architecture shown in FIG. 3 is sufficient for understanding the particulars of client computing devices and servers.

Computing device 300 may include more or less components than those shown in FIG. 3. However, the components shown are sufficient to disclose an illustrative solution implementing the present solution. The hardware architecture of FIG. 3 represents one implementation of a representative computing device configured to provide the autonomous control of a vehicle based on machine-learned driving habits of one or more people, and/or user-inputted information about user's driving style, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Radom Access Memory ("RAM"), a solid-state or a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Computing device 300 implements machine learning technology. In this regard, computing device 300 runs one or more software applications 322 for facilitating the autonomous control of vehicles based on machine-learned information about drivers thereof. The software algorithms 322 use machine learning algorithms 324 to learn driving habits of people associated with semi-autonomous vehicles and/or fully autonomous vehicles. This learned information can be used for various purposes as described herein. For example, sensor data can be collected specifying actions taken by a person while driving an autonomous vehicle (e.g., autonomous vehicle 102 of FIG. 1). This sensor data is processed to extract driving patterns of the person. The extracted driving patterns are then used to determine parameter values for one or more rules and/or to generate the one or more rules describing how a vehicle should be autonomously controlled when a particular driving style setting option is selected. The present solution is not limited to the particulars of this example.

Figure 4:
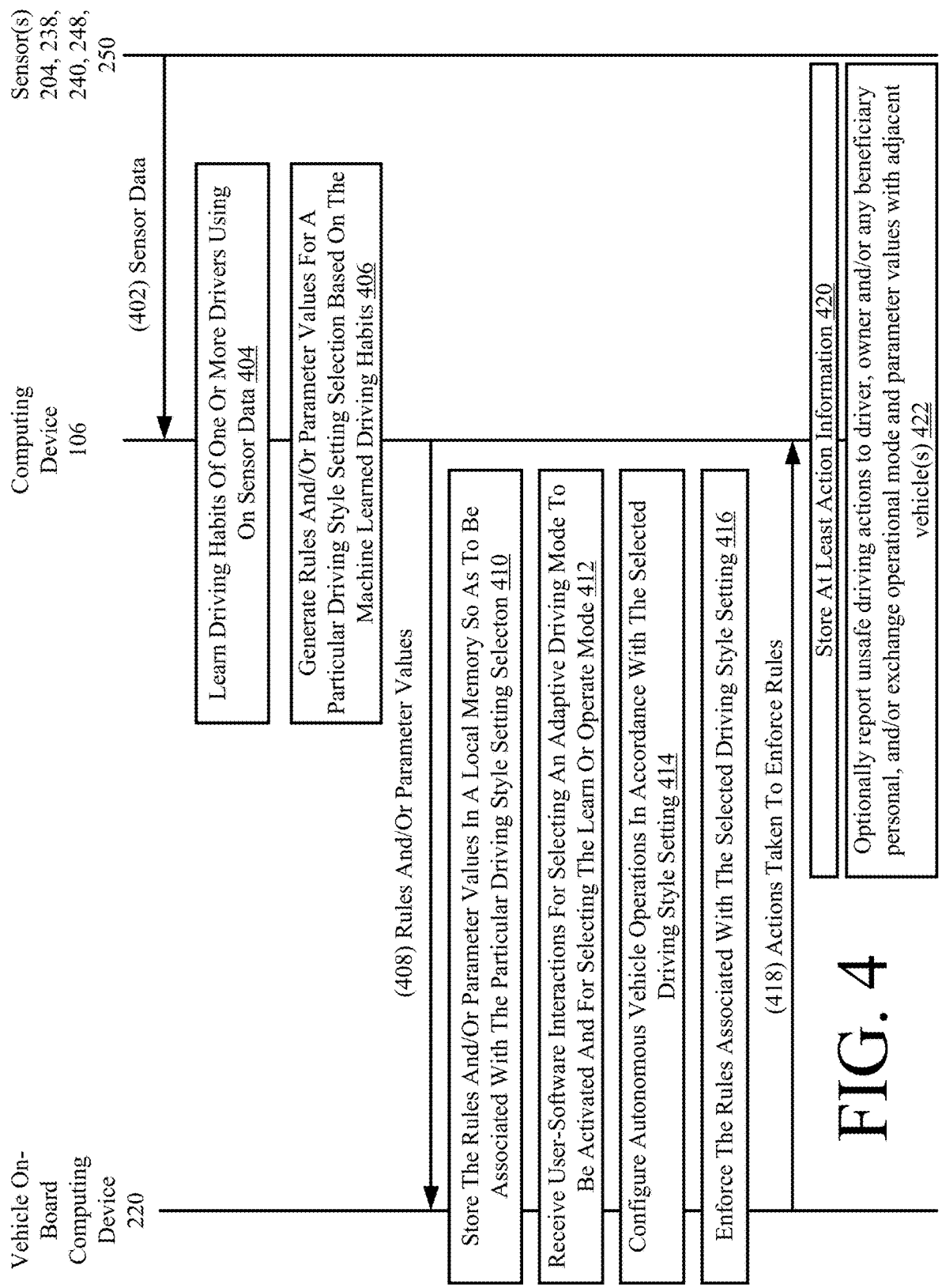
FIG. 4 is an illustration of an illustrative message flow for the system of FIG. 1.

Referring now to FIG. 4, there is provided a message flow for system 100. As shown by 402, one or more sensors 204, 238, 240, 248, 250 generate sensor data and communicate the same to a computing device 106. Next in 404, the computing device 106 performs operations to learn driving habits of one or more drivers using the sensor data, and/or user-inputted information about the user's driving habits. Any machine learning algorithm can be used herein without limitation. For example, one or more of the following machine learning algorithms is employed here: supervised learning; unsupervised learning; semi-supervised learning; and reinforcement learning. The machine-learned driving patterns or behaviors of a person driving the vehicle can be stored in a local memory of the vehicle, a local memory (e.g., memory 412 of FIG. 4) of the computing device 106, and/or in a remote datastore (e.g., datastore 120 of FIG. 1).

In 406, rules and/or parameter values are generated for a particular driving style setting selection option based on the machine-learned driving habits of a particular person. The rules and/or parameter values are then communicated from the computing device 106 to the vehicle on-board computing device 220 as shown by 408 and/or adjacent vehicles. Next in 410, the rules and/or parameter values are stored in a local memory of the vehicle on-board computing device 220 so as to be associated with the particular driving style setting selection option. The operations to program the particular driving style setting are similar to those performed in a conventional car for programming a person's car seat preferences, as known as memory seat control module, in relation to a particular one of two or three car seat setting selection options (e.g., 1, 2, or 3) (which can be selected via depression of a push button).

Subsequently, user-software interactions are received by the vehicle on-board computing device 220, as shown by 412. A first user-software interaction selects the ADM to be activated. A second user-software interaction selects the ADM to be in learn or operate mode. If the ADM operate mode is selected, the particular driving style setting selection option (e.g., 1 by depressing a button) will be selected. In response to the user-software interactions, the semi or fully autonomous vehicle operations are configured in accordance with the selected driving style setting as shown by 414.

Thereafter, the vehicle on-board computing device 220 performs operations in 416 to enforce rules associated with the selected driving style setting option. This enforcement can be achieved by performing operations by ADM software module(s) 108, 244 to subscribe to at least one event (e.g., an action or occurrence of recognized software). The ADM software module(s) 108, 244 can select the one or more events for subscription based on the particulars of the rules associated with the selected vehicle operational mode. This subscription can involve communicating a request for information to the vehicle's Operating System ("OS") 242 (e.g., pulling) or modifying the behavior of the OS to forward sensor data to the ADM software module(s) 108, 244 (e.g., hooking). When the vehicle OS detects an event (e.g., the reception of sensor data), it generates and sends a message to the ADM software module(s) 108, 244 (e.g., push notification or hook triggered). This message includes information indicating the event occurrence and sensor data specifying measured parameter values (e.g., speed). At the ADM software module(s) 108, 244, the measured parameters are compared against rule settings. For example, if a rule states that the vehicle speed should be 5 miles below the speed limit of 65 miles per hour, then the comparison involves comparing the measured speed value to the speed value of 65 miles per hour. Results of this comparison are then used to determine if an action needs to be taken (e.g., for example, slow down the vehicle speed via brakes or gear shifting). If so, the action is identified (e.g., apply brakes or shift gears) and a control message is generated by the ADM software module(s) 108, 244. The control message is sent from the ADM software module(s) 108, 244 to the vehicle OS. The vehicle OS controls operations of the vehicle in accordance with the contents of the control message. For example, the current speed of the vehicle is compared against a pre-defined speed threshold value. If the current speed value exceeds the pre-defined speed threshold value, then an action is taken such as causing the vehicles speed to be reduced to a value below the pre-defined speed threshold value. This reduction in speed overrides (in the case of semi-autonomous vehicle) any user action to control the vehicles speed if it is safe. The present solution is not limited to the particulars of this example.

The vehicle on-board computing device 220 notifies the computing device 106 of the action taken to enforce the rule(s), as shown by 418. Measured parameters can be provided with the notification message. This action information and/or measured parameter information is stored in 420. The action information and/or measured parameter information can be stored in a local memory of the vehicle, a local memory (e.g., memory 312 of FIG. 3) of the computing device 106, or in a remote datastore (e.g., datastore 120 of FIG. 1). This stored information defines historical information for the vehicle. This historical information and/or other information can be used as noted above to verify that the vehicle acted correctly in view of the machine-learned driving habits of the person.

Other optional operations can also be performed by the computing device 106 as shown by 422. For example, the computing device 106 can report unsafe driving actions to a driver of the vehicle, an owner of the vehicle and/or to any beneficiary personnel 118 (e.g., the police, insurance company, or employer). The computing device 106 may alternatively or additionally exchange operational mode and parameter values with at least one adjacent vehicle.

Figure 5:
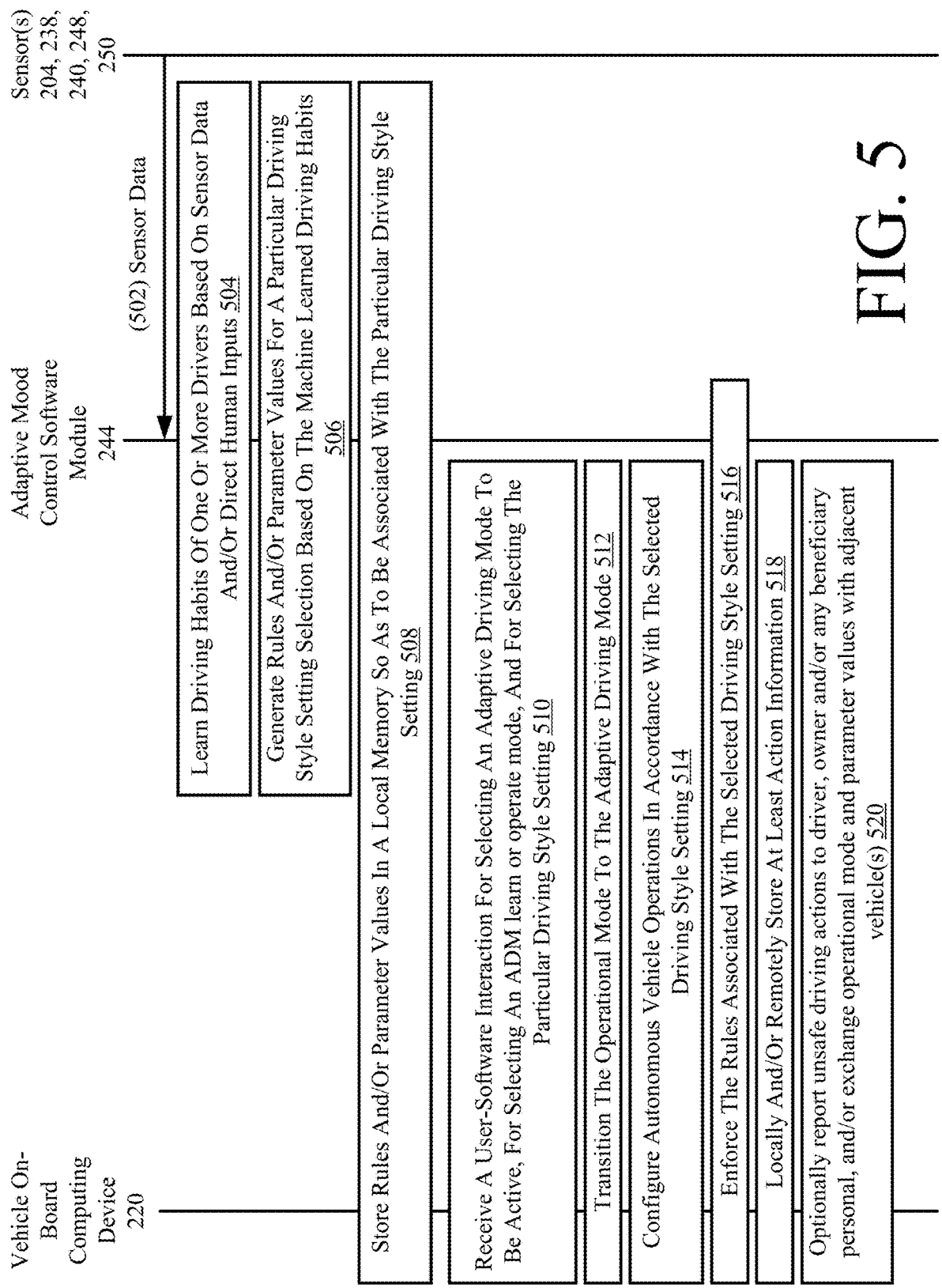
FIG. 5 is an illustration of an illustrative message flow for the system of FIG. 1.

Referring now to FIG. 5, there is provided a message flow for a system configured to control an autonomous vehicle based on machine-learned driving habits, patterns and/or behavior of a person (e.g., person 114 of FIG. 1). As shown by 502, one or more sensors 204, 238, 240, 248, 250 of the autonomous vehicle 102, 200 generates sensor data and communicates the same to the ADM software module 244 of the semi or fully autonomous vehicle 102, 200. Next in 504, the ADM software module 244 performs operations to determine a person's driving habits, patterns and/or behaviors based on the sensor data and/or direct human inputs. This determination can involve using (1) historical information by a machine learning algorithm (e.g., machine learning algorithm 324 of FIG. 3) to learn driving habits, patterns or behaviors of a person and/or (2) natural language processing technology to interpret human speech and/or simple expression inputs.

In 506, rules and/or parameter values are generated for a particular driving style setting selection option based on the machine-learned driving habits, patterns or behaviors of a particular person. The rules and/or parameter values are then stored in a local memory (e.g., memory 312 of FIG. 3) of the vehicle on-board computing device 220 so as to be associated with the particular driving style setting option, as shown by 508. The operations to program the particular driving style setting in 508 are similar to those performed in a conventional car for programming a person's car seat preferences in relation to a particular one of two or three car seat setting selection options (e.g., 1, 2, or 3), also known as memory seat control module.

Thereafter, the vehicle on-board computing device 220 receives a user-software interaction for selecting the ADM to be activated, a user-software interaction for selecting the ADM learn mode or ADM operate mode, and a user-software interaction for selecting a particular driving style setting (e.g., 1) from a plurality of driving style setting selection options (e.g., 1, 2 and 3). In response to the user-software interaction(s), the operational mode of the vehicle is transitioned to an adaptive driving mode as shown by 512, and semi or fully autonomous vehicle operations are configured in accordance with the selected driving style setting option as shown by 514. The user-software interaction for the aforementioned selections may have different configurations or an automatic selection for the sake of convenience. The present solution is not limited to the particulars of this example.

Next, the vehicle on-board computing device 220 performs operations in 516 to enforce rules associated with the selected driving style setting option. This enforcement can be achieved by performing operations by ADM software module 244 to subscribe to at least one event (e.g., an action or occurrence of recognized software). The ADM software module 244 can select the one or more events for subscription based on the particulars of the rules associated with the selected vehicle operational mode. This subscription can involve communicating a request for information to the vehicle's Operating System ("OS") 242 (e.g., pulling) or modifying the behavior of the OS to forward sensor data to the ADM software module 244 (e.g., hooking). When the vehicle OS detects an event (e.g., the reception of sensor data), it generates and sends a message to the ADM software module 244 (e.g., push notification or hook triggered). This message includes information indicating the event occurrence and sensor data specifying measured parameter values (e.g., speed). At the ADM software module 244, the measured parameters are compared against rule settings. For example, if a rule states that the vehicle speed should be 5 miles below the speed limit of 65 miles per hour, then the comparison involves comparing the measured speed value to the speed value of 65 miles per hour. Results of this comparison are then used to determine if an action needs to be taken (e.g., for example, slow down the vehicle speed via brakes or gear shifting). If so, the action is identified (e.g., apply brakes or shift gears) and a control message is generated by the ADM software module 244. The control message is sent from the ADM software module 244 to the vehicle OS. The vehicle OS controls operations of the vehicle in accordance with the contents of the control message. For example, the current speed of the vehicle is compared against a pre-defined speed threshold value. If the current speed value exceeds the pre-defined speed threshold value, then an action is taken such as causing the vehicles speed to be reduced to a value below the pre-defined speed threshold value. This reduction in speed overrides (in the case of semi-autonomous vehicle) any user action to control the vehicles speed if it safe. The present solution is not limited to the particulars of this example.

Action information and/or measured parameter information is stored in 518. The action information and/or measured parameter information can be stored in a local memory of the vehicle, a local memory (e.g., memory 312 of FIG. 3) of the vehicle on-board computing device 220, or in a remote datastore (e.g., datastore 120 of FIG. 1). This stored information defines historical information for the vehicle. This historical information can be used as noted above to verify that the vehicle acted correctly in view of the machine-learned driving habits of the person.

Other optional operations can also be performed by the vehicle on-board computing device 220 as shown by 520. For example, the vehicle on-board computing device 220 can report unsafe driving actions to a driver of the vehicle, an owner of the vehicle and/or to beneficiary personnel (e.g., the police, insurance company, or employer). The vehicle on-board computing device 220 may alternatively or additionally exchange operational mode and parameter values with at least one adjacent vehicle 126.

Referring now to FIG. 6, there is provided a flow diagram of an illustrative method 600 for controlling operations of a vehicle (e.g., vehicle 102 of FIG. 1 and/or 200 of FIG. 2) based on machine-learned driving habits, patterns and/or behaviors of at least one person (e.g., person 114 of FIG. 1). Method 600 comprises a plurality of operations 602-644. The present solution is not limited to the order of the operations 602-644 shown in FIG. 6. Some or all of the operations of 602-644 can be performed in the same or different order than that shown in FIG. 6. Also, one or more of the operations 602-644 can be eliminated from method 600 in accordance with a given application.

Figure 6A:
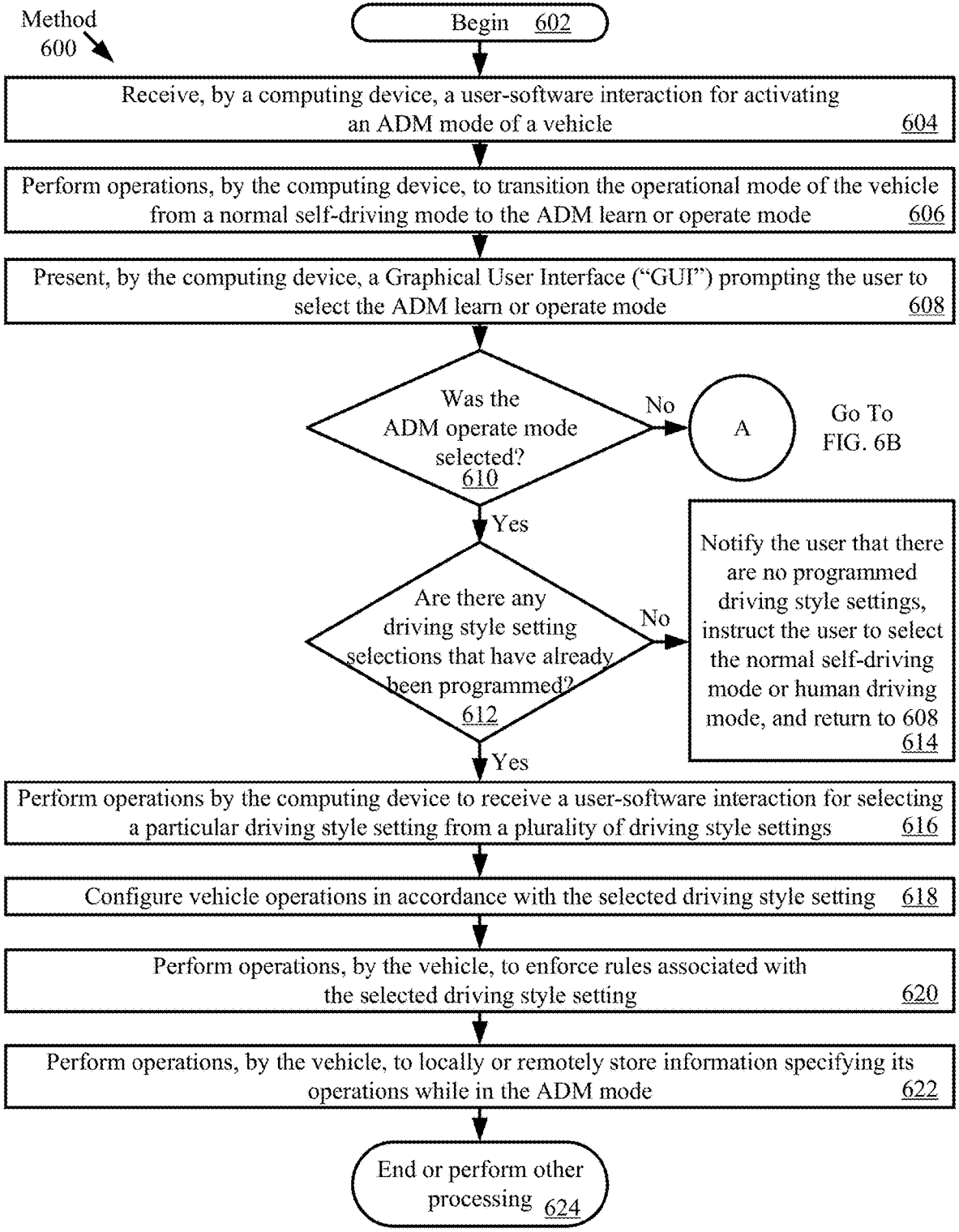
FIGS. 6A-6B (collectively referred to as "FIG. 6") is a flow diagram of an illustrative method for controlling operations of a vehicle based on machine learned driving habits of one or more people.
Figure 6B:
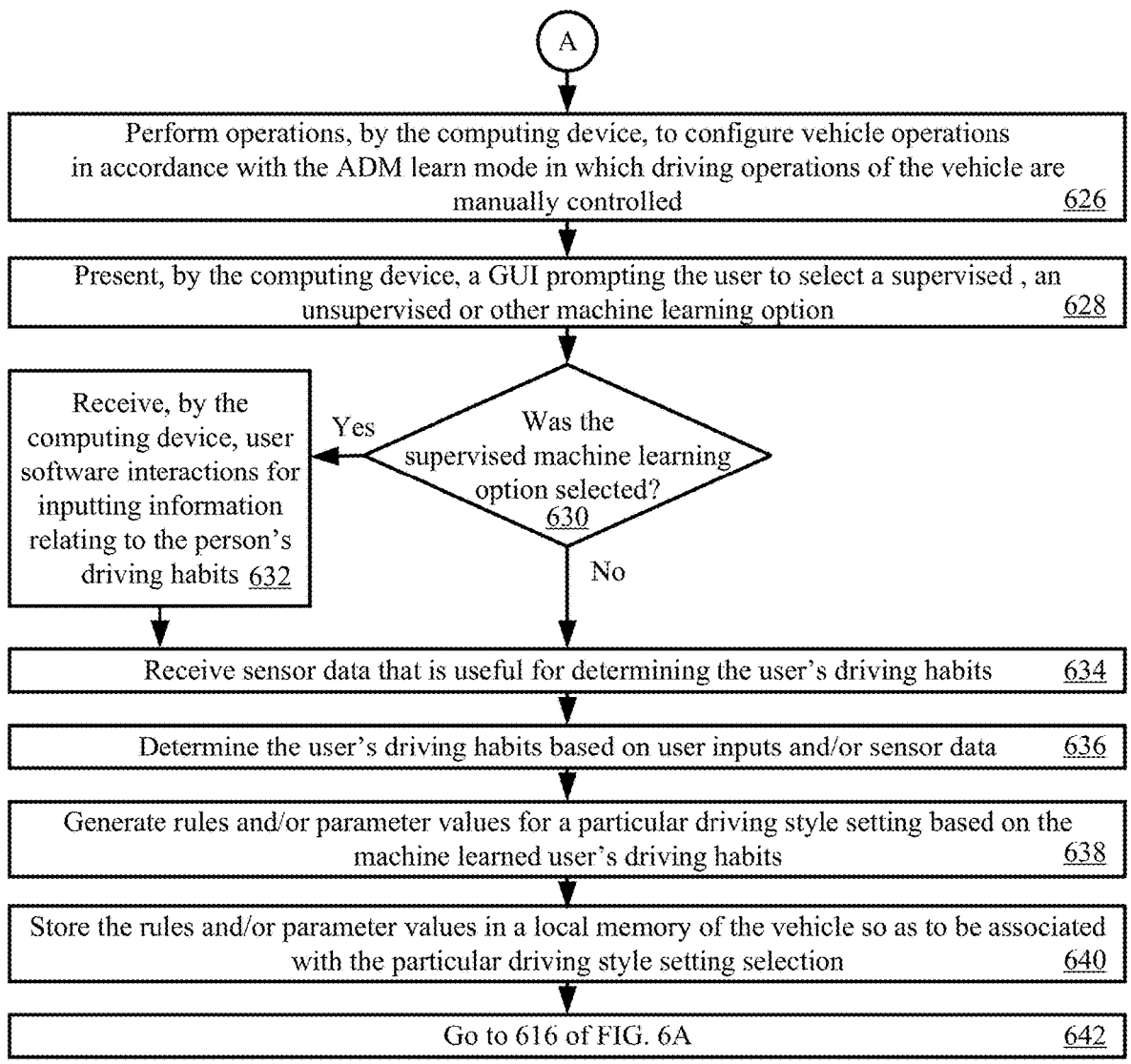

As shown in FIG. 6A, method 600 begins with 602 and continues with 604 where a computing device (e.g., computing device 106 of FIG. 1, 220 of FIG. 2 and/or 300 of FIG. 3) receives a user-software interaction for activating an ADM mode of the vehicle. The user-software interaction can include, but is not limited to, the selection of an item from a drop down menu, the depression of a virtual button presented on a display (e.g., display 236 of FIG. 2 and/or display 354 of FIG. 3) of the computing device, or an automatic selection based on biometric information of the driver. The biometric information includes, but not limited to, face, voice, eye and/or fingerprint.

Once the ADM mode is activated, the computing device performs operations in 606 to transition the operational mode of the vehicle from a normal self-driving mode to the ADM learn or operate mode. In next 608, the computing device presents a Graphical User Interface ("GUI") prompting a user to select a machine learning option (e.g., from a drop down menu). All or part of these selections might be automatic through different technologies.

In 610, the computing device receives a user-software interaction selecting the ADM operate mode or the ADM learn mode. The user-software interaction can include, but is not limited to, the selection of an item from a drop down menu, the depression of a virtual button presented on a display (e.g., display 236 of FIG. 2 and/or display 454 of FIG. 4) of the computing device, or an automatic selection based on biometric information of the driver. The biometric information includes, but is not limited to, face, voice, eye and/or fingerprint. If the ADM learn mode was selected [610:NO], then method 700 continues with 626-644 of FIG. 6B. 662-644 will be discussed below. If the ADM operate mode was selected [610:YES], then method 700 continues with 612.

In 612, a determination is made as to whether or not there are any driving style setting selections that have already been programmed. If not [612:NO], then 614 is performed where: the user is notified that there are no programmed driving style settings; the user is instructed to select the normal self-driving mode that does not follow any specific driving style, or human-driving mode to start the learning process; and method 600 returns to 608. If so [612:YES], then 616-622 are performed. 616-622 involve: performing operations by the computing device to receive a user-software interaction for selecting a particular driving style setting (e.g., 1) from a plurality of driving style setting selection options (e.g., 1, 2, and 3); configuring vehicle operations in accordance with the selected driving style setting; enforcing the rules associated with the selected driving style setting; and local or remotely storing information specifying the vehicle's operations while in the ADM mode. Subsequently, 624 is performed where method 600 ends or other processing is performed.

As noted above, 626-644 of FIG. 6B are performed when the ADM learn mode was selected instead of the ADM operate mode. As shown in FIG. 6B, 626-628 involve: performing operations by the computing device to configure vehicle operations in accordance with the ADM learn mode in which driving operations of the vehicle are manually controlled; and presenting a GUI prompting the user to select a supervised machine learning option, an unsupervised machine learning option, or other machine learning options.

In 630, a user-software interaction is received for selecting the supervised or unsupervised machine learning option. If the unsupervised machine learning option was selected [630:NO], then method 600 continues with 634 which will be discussed below. In contrast, if the supervised machine learning option was selected [630:YES], then 632 is performed where the computing device receives user-software interactions for inputting information (e.g., simple expressions) relating to the person's driving habits (e.g., preferred roads, preferred speeds, preferred braking distances, preferred AC settings, preferred radio settings, etc.). The user-software interaction can include, but is not limited to, the selection of an item from a drop down menu, the depression of a virtual button presented on a display (e.g., display 236 of FIG. 2 and/or display 454 of FIG. 4) of the computing device, or an automatic selection based on biometric information of the driver. The biometric information including, but not limited to, face, voice, eye, and/or fingerprint. Subsequently, method 600 continues with 634.

In 634, the computing device receives sensor data. This sensor data is used in 836 to determine the users driving habits, patterns and/or behaviors in addition to or as an alternative to the user inputs of 632. The machine-learned driving habits, patterns and/or behaviors are used in 638 to generate rules and/or parameter values for a particular driving style setting (e.g., 1). The rules and/or parameter values are stored in a local memory of the vehicle so as to be associated with the particular driving style setting (e.g., 1). Subsequently, method 600 goes to 616 of FIG. 6A as shown by 642.

Figure 7:
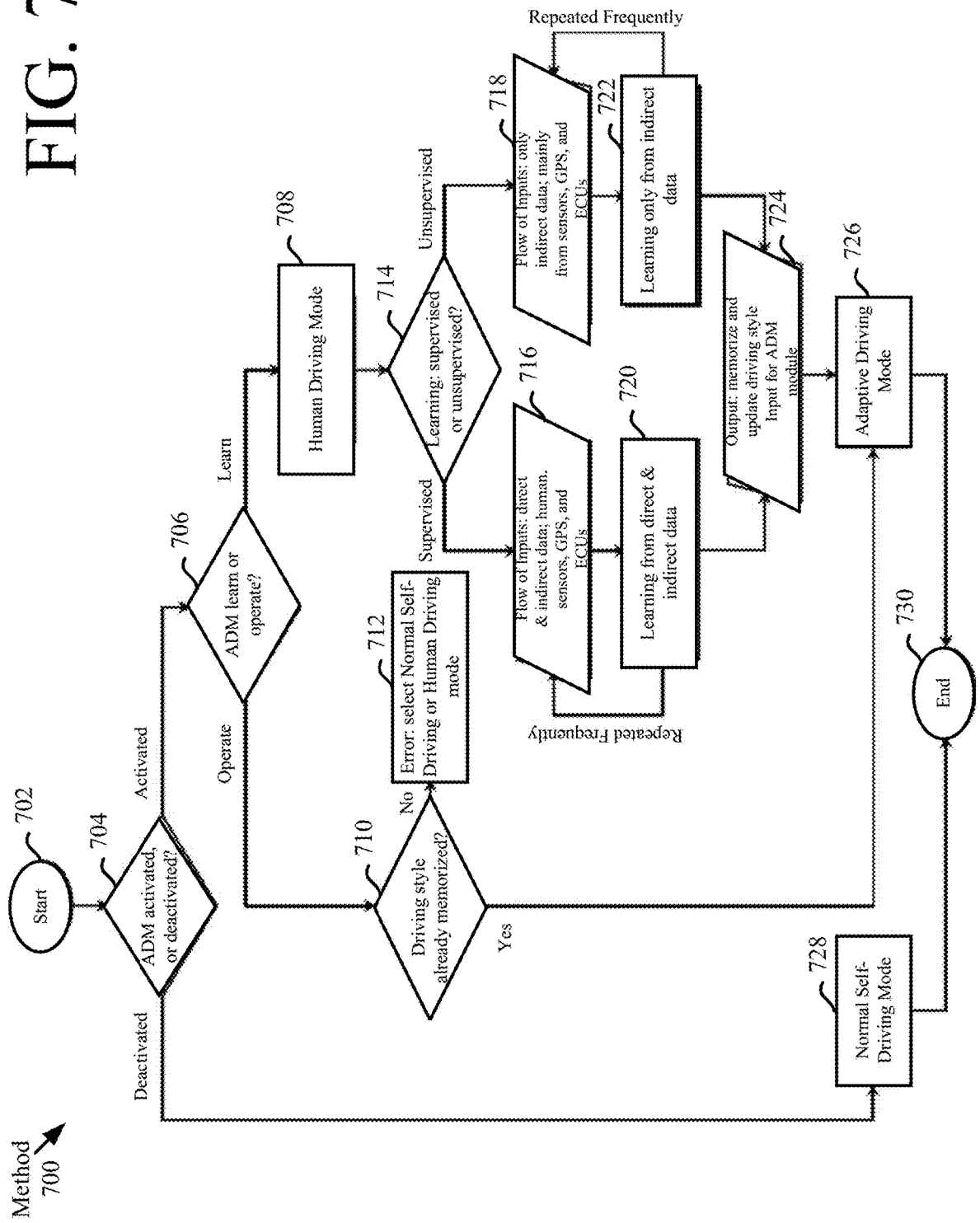
FIG. 7 is a flow diagram of an illustrative method for ADM technology.

Referring now to FIG. 7, there is provided a flow diagram of an illustrative method 700 for ADM technology. Method 700 starts at 702 and continues with 704 where a decision is made as to whether ADM is activated or deactivated. If ADM is deactivated, then method 700 continues with 728 where the vehicle is placed in normal self-driving mode. Next in 730, method 700 ends.

If ADM is activated, then method 700 continues with 706 where a selection is made for an ADM learn mode or an ADM operate mode. If the ADM operate mode is selected, then 710 is performed where it is determined whether a driving style is already memorized for the passenger of the vehicle. If so, 726 is performed where the vehicle is placed in an adaptive driving mode. If no, then an error is detected and the user is prompted to select a normal self-driving mode or a human-driving mode.

If ADM learn mode is selected, then 708 is performed where the vehicle is placed in a human-driving mode. Next in 714, a selection is made for supervised or unsupervised machine learning. If supervised machine learning is selected, then 716, 720, 724 and 726 are performed. These operations involve: receiving direct and indirect input data from human, sensors, location devices (e.g., GPS device), and/or ECUs; learning from the direct and indirect data; memorizing and updating the driving style for the given passenger of the vehicle; inputting the updated driving style to an ADM software module; and placing the vehicle in ADM. Subsequently, method 700 ends as shown by 730.

If the unsupervised machine learning is selected, then 718, 722, 724 and 726 are performed. These operations involve: receiving only indirect input data mainly from sensors, location devices (e.g., GPS device, and/or ECUs; learning only from the indirect data; memorizing and updating the driving style for the given passenger of the vehicle; inputting the updated driving style to an ADM software module; and placing the vehicle in ADM. Subsequently, method 700 ends as shown by 730.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the aforementioned described embodiments. Rather, the scope of the present solution should be defined in accordance with the following claims and their equivalents.

What is claimed is:

1. A method for controlling a vehicle, comprising:
 placing, by a computing device, the vehicle in an adaptive driving mode with an adaptive machine learning option that is activated to facilitate learning of new autonomous driving rules associated with a driving style of a person;
 receiving, by the computing device from at least one sensor, first sensor information specifying actions taken by the person while driving the vehicle;
 performing machine learning operations to learn first driving habits of the person based at least on the first sensor information;
 determining at least one autonomous driving rule for a particular driving style setting of a plurality of driving style setting options based on the machine-learned driving habits of the person, the at least one autonomous driving rule configured to cause performance of autonomous driving operations of the vehicle;
 programming the particular driving style setting using the at least one autonomous driving rule;
 activating an adaptive operate option of the adaptive driving mode to cause the vehicle to operate at least partially autonomously in accordance with the particular driving style setting;
 causing a value of at least one operational parameter that is selected by a user input during user control of the vehicle to be overridden in accordance with the at least one autonomous driving rule; and
 deactivating the adaptive machine learning option of the adaptive driving mode based on operational information received from an adjacent vehicle, while maintaining the adaptive operate option of the adaptive driving mode in an activated state.

2. The method according to claim 1, wherein the machine-learned driving habits of the person are learned further based on user inputs.

3. The method according to claim 1, further comprising:
 receiving a user-software interaction for activating the adaptive driving mode of the vehicle; and
 transitioning an operational mode of the vehicle from a normal self-driving mode to the adaptive driving mode in response to the user-software interaction.

4. The method according to claim 3, further comprising prompting a user to select the adaptive machine learning option when an adaptive driving mode software module of the vehicle is activated.

5. The method according to claim 4, wherein the first sensor information is received, the machine learning operations are performed, the at least one autonomous driving rule is determined, and the particular driving style setting is programmed when the ADM learn mode is selected.

6. The method according to claim 4, wherein the at least one autonomous driving rule is enforced when the adaptive driving mode is selected.

7. The method according to claim 1, further comprising providing a notification to the person when there are no programmed driving style settings, and instructing the person to select a normal self-driving mode that does not follow any driving style or a human-driving mode to start a learning process.

8. The method according to claim 1, wherein the vehicle comprises a semi-automated vehicle or fully automated vehicle.

9. The method according to claim 1, wherein a memorized active driving style and parameter values are exchanged with at least one adjacent vehicle for achieving objectives of an adaptive driving mode software module and objectives of the vehicle.

10. The method according to claim 1, further comprising reporting an unusual, aggressive, or lawful unsafe driving style to at least one of a driver of the vehicle, a registered owner of the vehicle, and beneficiary personnel.

11. The method according to claim 1, further comprising automatically selecting a driving style setting option based on biometric information of a driver of the vehicle.

12. A system, comprising:
a processor;
a non-transitory computer-readable storage medium comprising programming instructions that are configured to cause the processor to implement a method for operating a vehicle, wherein the programming instructions comprise instructions to:
place the vehicle in an adaptive driving mode with an adaptive machine learning option that is activated to facilitate learning of new autonomous driving rules associated with a driving style of a person;
receive first sensor information specifying actions taken by the person while driving the vehicle;
perform machine learning operations to learn first driving habits of the person based at least on the first sensor information;
determine at least one autonomous driving rule for a particular driving style setting of a plurality of driving style setting options based on the machine-learned driving habits of the person, the at least one autonomous driving rule configured to cause performance of autonomous driving operations of the vehicle;
program the particular driving style setting using the at least one autonomous driving rule;
activate an adaptive operate option of the adaptive driving mode to cause the vehicle to operate at least partially autonomously in accordance with the particular driving style setting;
cause a value of at least one operational parameter that is selected by a user input during user control of the vehicle to be overridden in accordance with the at least one autonomous driving rule, when the particular driving style setting is selected;
deactivating the adaptive machine learning option of the adaptive driving mode based on operational information received from an adjacent vehicle, while maintaining the adaptive operate option of the adaptive driving mode in an activated state.

13. The system according to claim 12, wherein the machine-learned driving habits of the person are learned further based on user inputs.

14. A vehicle, comprising:
a plurality of sensors configured to generate sensor data specifying actions taken by a person while driving the vehicle;
a vehicle on-board computing device communicatively coupled to the plurality of sensors, and configured to:
place the vehicle in an adaptive driving mode with an adaptive machine learning option that is activated to facilitate learning of new autonomous driving rules associated with a driving style of a person;
receive the sensor data from the plurality of sensors;
perform machine learning operations to learn first driving habits of the person based at least on the sensor data;
determine at least one autonomous driving rule for a particular driving style setting of a plurality of driving style setting options based on the machine-learned driving habits of the person, the at least one autonomous driving rule configured to cause performance of autonomous driving operations of the vehicle;
program the particular driving style setting using the at least one autonomous driving rule;
activate an adaptive operate option of the adaptive driving mode to cause the vehicle to operate at least partially autonomously in accordance with the particular driving style setting;
cause a value of at least one operational parameter that is selected by a user during user control of the vehicle to be overridden in accordance with the at least one autonomous driving rule, when the particular driving style setting is selected; and
deactivate the adaptive machine learning option of the adaptive driving mode based on operational information received from an adjacent vehicle, while maintaining the adaptive operate option of the adaptive driving mode in an activated state.

15. The vehicle according to claim 14, wherein the machine-learned driving habits of the person are learned further based on user inputs.

16. The vehicle according to claim 14, wherein the vehicle on-board computing device is further configured to:
receive a user-software interaction for activating the adaptive driving mode of the vehicle; and
transition an operational mode of the vehicle from a normal self-driving mode to the adaptive driving mode in response to the user-software interaction.

17. The vehicle according to claim 16, wherein the vehicle on-board computing device is further configured to prompt a user to select the adaptive machine learning option when an adaptive driving mode software module of the vehicle is activated.

18. The vehicle according to claim 17, wherein the sensor data is received, the machine learning operations are performed, the at least one autonomous driving rule is determined, and the particular driving style setting is programmed when the ADM learn mode is selected.

19. The vehicle according to claim 17, wherein the at least one autonomous driving rule is enforced when the adaptive driving mode is selected.

20. The vehicle according to claim 14, wherein the vehicle on-board computing device is further configured to provide a notification to the person when there are no programmed driving style settings, and instruct the person to select a normal self-driving mode that does not follow any driving style or a human-driving mode to start a learning process.

21. The vehicle according to claim 14, wherein the vehicle comprises a semi-automated vehicle or fully automated vehicle.

22. The vehicle according to claim 14, wherein a memorized active driving style and parameter values are exchanged with at least one adjacent vehicle for achieving objectives of an adaptive driving mode software module and objectives of the vehicle.

23. The vehicle according to claim 14, wherein an unusual, aggressive, or lawful unsafe driving style is reported to at least one of a driver of the vehicle, a registered owner of the vehicle, and beneficiary personnel.

24. The vehicle according to claim 14, wherein a driving style setting option is automatically selected based on biometric information of a driver of the vehicle.

25. The method according to claim 1, further comprising performing operations by the vehicle to prompt the person to select a supervised machine learning option or an unsupervised machine learning option.

26. The method according to claim 25, further comprising receiving by the vehicle a user software interaction selecting the supervised machine learning option.

27. The method according to claim 26, further comprising performing machine learning operations by the vehicle in response to a direct user input and an indirect input.

28. The method according to claim 25, further comprising receiving by the vehicle a user software interaction selecting the unsupervised machine learning option.

29. The method according to claim 28, further comprising performing machine learning operations by the vehicle in response to an indirect input.

30. The method according to claim 1, wherein the first driving habits of the person are machine learned based on second sensor information in addition to the first sensor information, the second sensor information being received from another vehicle and specifies actions taken by the person while driving the another vehicle.

* * * * *